United States Patent [19]

Justice

[11] Patent Number: 5,295,070

[45] Date of Patent: Mar. 15, 1994

[54] ELECTRONIC DUAL LANGUAGE DICTIONARY

[75] Inventor: David Justice, Princeton, N.J.

[73] Assignee: Franklin Electronic Publishers Incorporated, Mt. Holly, N.J.

[21] Appl. No.: 708,734

[22] Filed: May 31, 1991

[51] Int. Cl.[5] .............................................. G06F 15/38
[52] U.S. Cl. .................................. 364/419.02
[58] Field of Search ........................................ 364/419

[56] References Cited

U.S. PATENT DOCUMENTS

| | | | |
|---|---|---|---|
| 4,406,626 | 9/1983 | Anderson et al. | 364/419 |
| 4,542,478 | 9/1985 | Hashimoto et al. | 364/419 |
| 4,594,686 | 6/1986 | Yoshida | 364/419 |
| 4,733,368 | 3/1988 | Morimoto et al. | 364/419 |
| 4,748,589 | 5/1988 | Kanou et al. | 364/419 |

Primary Examiner—Robert A. Weinhardt
Attorney, Agent, or Firm—McAuley Fisher Nissen Goldberg & Kiel

[57] ABSTRACT

A dual language information and dictionary machine permits operator selection of a message language, usually the operator's home language, and operator selection of an input word language. Operator input and entry of the word and the language selected provides translation, grammar and related dictionary information concerning the input word. Operator sequencing of an inflection request provides detailed information concerning each tense of the input word in the language into which it is translated together with information about each tense in the message or home language selected. Information screens are available at the request of the user at all operating states to provide additional information or directions.

19 Claims, 3 Drawing Sheets

ELECTRONIC DUAL LANGUAGE DICTIONARY

BACKGROUND OF THE INVENTION

This invention relates, in general, to a dual language electronic reference machine. More particularly, this invention relates to a bilingual language teaching machine is which words in either of the two languages involved can be entered and information, in either language, is provided about the entered word. The information provided includes inflections of the translation of the input word and information about those inflections.

A wide variety of electronic language reference products are available or taught in the literature. These products provide information concerning spelling, grammar and pronunciation. A number of products have been devised which disclose some dual language capability.

U.S. Pat. No. 4,809,192 issued in February 1989 to Washizuka et. al. discloses a language translator with a speech synthesizer which in effect is a talking phrase book with ability to input certain words.

U.S. Pat. No. 4,393,462 issued Jul. 12, 1983 to Tanimoto et. al. discloses a precision electronic translator that provides pronunciation of an input word and means for pronouncing the translated word equivalent to the input word.

U.S. Pat. No. 4,489,396 issued Dec. 18, 1984 to Hashimoto et. al. is a translator with a voice synthesizer for pronunciation of the specific words in the input word language.

These and other translation devices provide translation of a word, and in some cases a phrase, together with pronunciation of the input word and/or pronunciation of the translated word or phrase. They sometimes also provide definitional information. They are useful in the limited context of a traveler. But they provide little or no introduction to the use of a language and are inadequate as a teaching or learning tool for learning about a second language.

What is needed is a technique for providing in depth information about a foreign language to enable a user to employ the language in a more usual conversational fashion. This requires the presentation of not only a translation and the usual dictionary information but also the inflected forms of the word in the language being learned and a discussion of the inflected forms. These inflected forms include tenses and moods of verbs, masculine and feminine forms of the words and plurals. Furthermore, instructional material concerning the significance and meaning of the various inflected forms is important in order to understand the context of the usage.

Providing all this information in a usable and useful manner for the person learning the language requires a mode of presentation that avoids burying the user in the information yet provides information necessary to enable the user to learn a language in depth. The mode of presentation is the key to the utility of an electronic language learning machine.

Accordingly, a major purpose in this invention is to provide a dual language reference product that is optimally accommodated to the learning requirements of a user so as to facilitate the learning of a foreign language.

It is a related purpose of this invention to provide such a device as can be used by individuals having a wide range of competence in the language being learned.

More particularly, it is a purpose of this invention to provide a compact, hand held, self-contained dual language reference product that meets the above objectives.

BRIEF DESCRIPTION

A dual language information and dictionary machine provides operator choice of the language of the information presented and of the language of the input words to be translated. The first and more basic language mode choice is the choice of the language of the messages that are provided to the user. The message language will normally be in the language that is most familiar to the user. For example, an English speaker learning Spanish will want English-language prompts, error messages, and help text, including English language discussions of the inflections involved.

Once this message language mode selection has been made, the user then has a second choice of modality relating to the language of the input words—the words he is looking up. An English speaker seeking to learn Spanish will select the Spanish input word parameter when checking out the meaning of a Spanish word and will select the English input word parameter when seeking the equivalent Spanish word.

In broad terms, the user can select any combination of one of the two message language modes and one of the two input word language modes. Thus, there are four modes of operation which can be set up by the user.

Once one of the four modes of operation has been selected, the user then enters the word and the translation dictionary provides a display which includes the entered word, translation information and grammatical information about the word. The user then obtains various inflection forms of the input word by pressing an inflection key. The user can then progress forward and back through a series of inflection paradigms, twelve or thirteen in one embodiment. At each inflection state, the screen provides basic inflection information and an example of the word and a brief sentence having that inflection.

The user can then press an information key to obtain information about the inflection state involved.

In this fashion, input words, either in the user's home language or in a language being learned, are shown with a translation into the other language. The user, although normally selecting the home language as the message language, can switch to the language being learned as the message language. In this fashion, the user can cause the machine to be adapted to the user's level of knowledge in the language being learned.

In addition, by providing a series of inflection states, each separately shown on the display screen, the user can explore a given word in whatever grammatical depth the user desires. This permits the user to adapt the machine to the user's level of knowledge in the language being learned.

DESCRIPTION OF THE PREFERRED EMBODIMENTS

Figure 1:
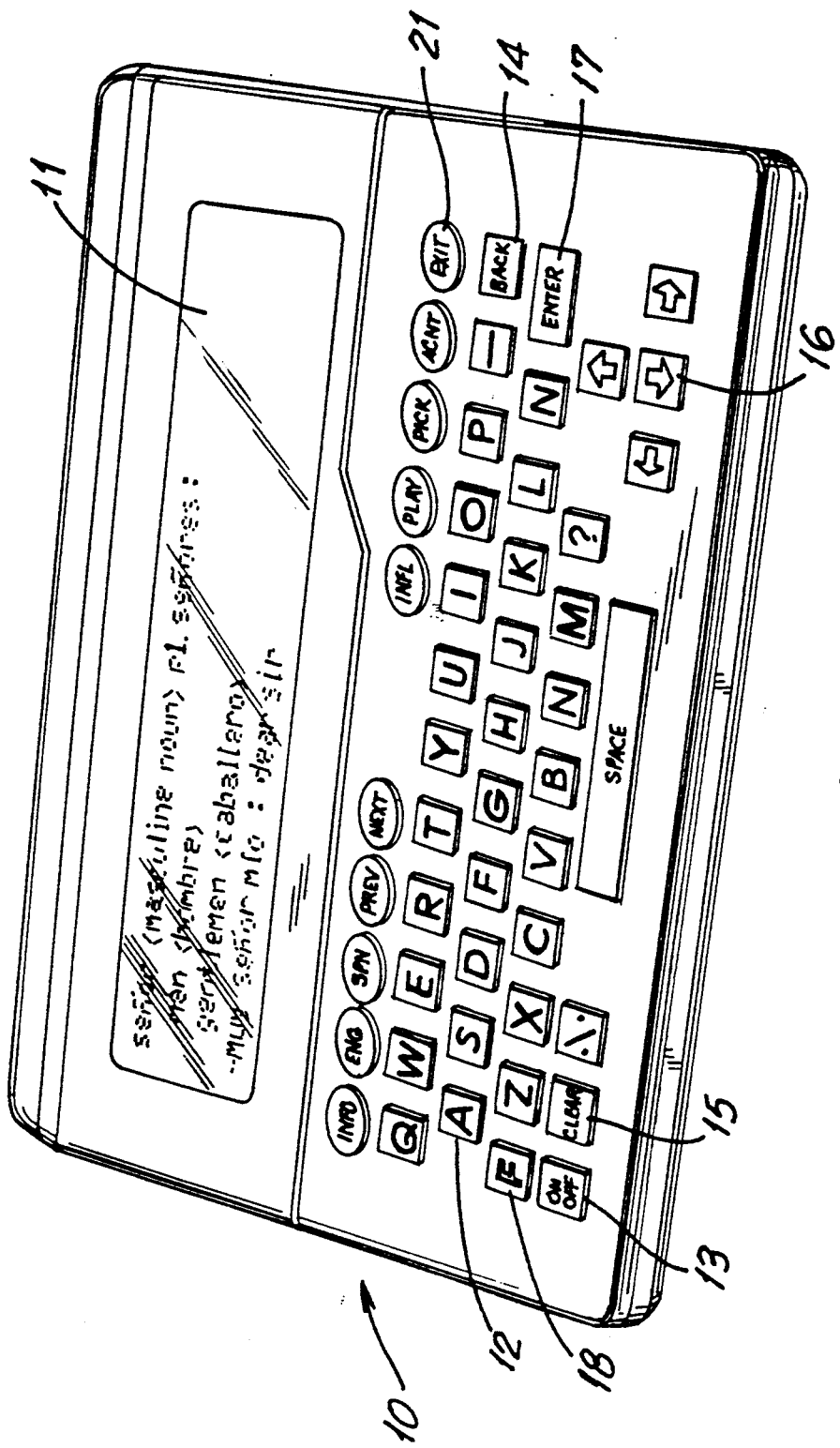
FIG. 1 a representation of a device of the invention showing a keyboard and a display screen.

As indicated in FIG. 1, one embodiment of the device of this invention is a self-contained battery operated, readily portable device 10 having a character display screen 11 and a keyboard 12. The keyboard 12 includes the twenty-six letters of the alphabet, plus any further alphabetic characters necessary for the foreign language (n-plus-tilde for Spanish, c-cedilla for French, etc.). an on/off switch 13 which toggle on and off. The BACK key 14 is a correction key that erases the last character entry. The CLEAR key 15 clears the display so as to permit the user to enter a new input word. The scroll keys 16 permit the user to scroll up and down through a description or presentation that is larger than fits on the screen. The ENTER key 17 is important to enter an input word. When the user inputs a word onto the keyboard and the word is complete, pressing the ENTER key 17 causes the bilingual dictionary information to be presented on the screen 11.

Most of the function keys are on the top row. They are the more significant keys for the purpose of this invention as is the function key 18 designated with an open faced "F". When the device is turned on, the function key 18 actuates the functions that permits selection of the message language desired. If the user is a native English speaker, the individual will press the ENG key 19. If the user is a native Spanish speaker, the individual will press the SPN key 20. That is the set up for the message language and will control the message language unless the user goes through the routine of pressing the function key 18 and purposely selects a different message language.

With the message language selected, the user presses the EXIT key 21 and the screen will indicate that the device is ready for the acceptance of an entry word. If the message language selected was English, then the screen will state either "Ready for a word in Spanish." or "Ready for a word in English." The ENG key 19 and SPN key 20 can be actuated to select which input word the device is ready for. Thus if the device reads "Ready for a word in Spanish" and one wishes to input an English word, the user strikes the ENG key 19 and the device will state "Ready for a word in English".

Similarly, if the message language Spanish was selected, the screen will display "Listo para una palabra en español". The "espanoñol" mode selection can be changed to "inglés" mode selection by pressing the ENG key 19.

With the message language mode selected and the input language mode selected, an input word is input by the user using the keyboard. If the message language is English and the input word language is English and the input word "write" is displayed the user presses the ENTER key 17 to provide the dictionary screen display. The dictionary screen for the input word "write" includes: "write (transitive or intransitive verb): escribir". This dictionary screen further shows various other ways in which the word is used and shows, for example, "write down (transitive verb): escribir - [note]: apuntar." The dictionary screen can designate other usages of "write" with translations including "write off", "write out", "write up" and the noun "write-off", etc.

Employing the same example, if the user now presses the INFL key 22, the various inflection screens will be presented. In one embodiment, the first inflection screen is a summary inflection screen. For the word "write", it can include for example four tenses, the present tense "I write", a past tense "I wrote", etc. Subsequent actuation of the inflection INFL key 22 will present the various tenses of "write" with Spanish language designation of the tense. For example, the second inflection screen will present "write: PRESENTE INDICATIVO" and will give as an example "I write". Actuation of either the INFL key 22 or the NEXT key 23 will enable the user to cycle through a dozen or so tenses with examples regarding each tense.

At any inflection screen, actuation of the INFO key 24 will provide a Spanish language description of the tense displayed and may also provide examples.

Figure 2:
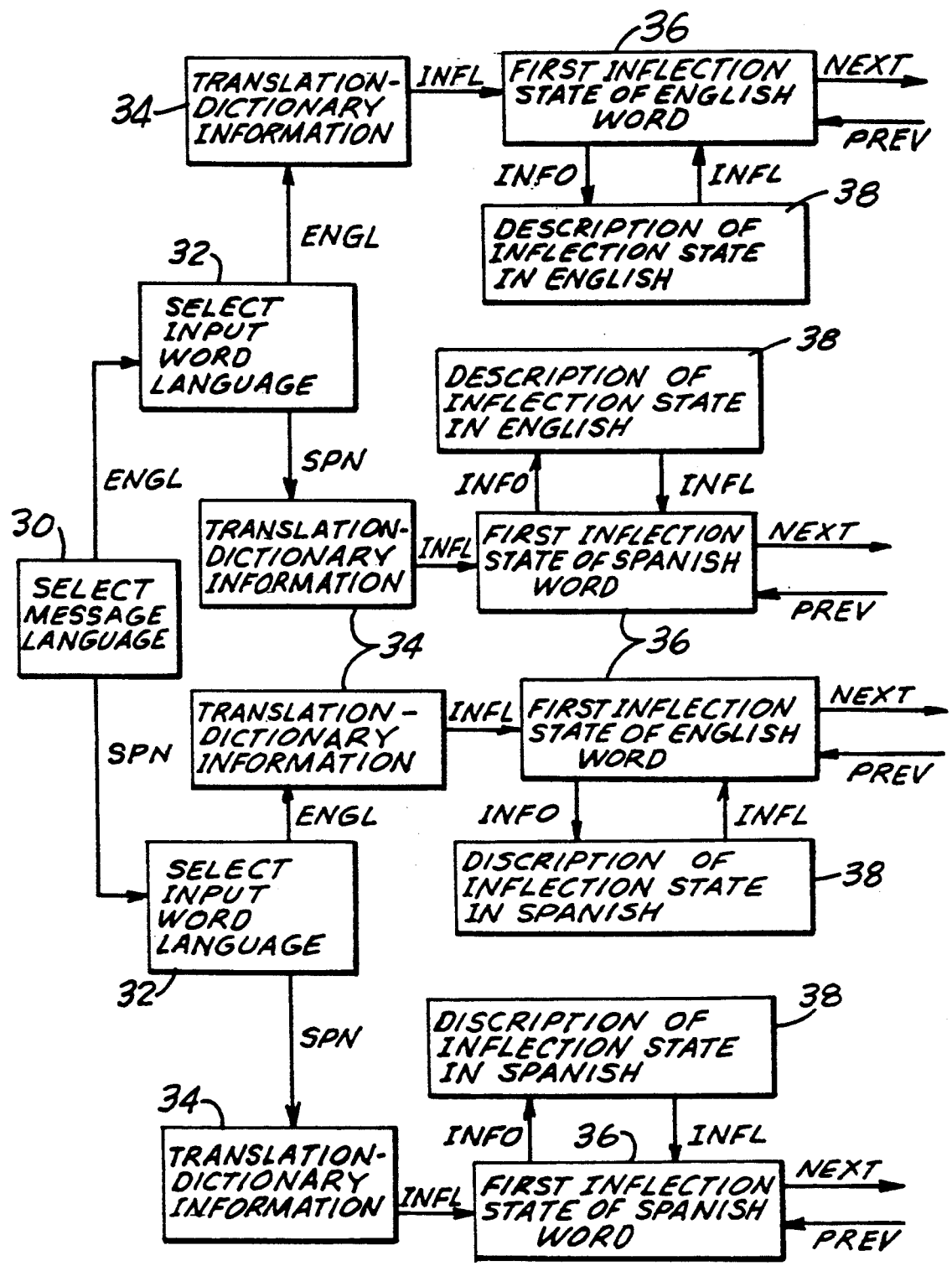
FIG. 2 is a logic diagram showing the sequence of operator selection of message language, information word language and inflection information.

The PREV key 25 and NEXT key 23 can be used, as indicated in FIG. 2, to move back and forth between the various inflection states. The INFO key 24 and INFL key 22 are used to cycle back and forth between a particular inflection state displayed and a description of that particular inflection state, again as shown in FIG. 2.

In one preferred embodiment, pressing the INFO key 24 after the device is in the state where it presents a description of a particular inflection state will provide further information. For example, if one is in the inflection state that shows the imperfect tense and presses the INFO key 24, a screen is provided which describes the imperfect tense. For example, such an information screen in an English message language mode would state: "The imperfect is used to describe something in the past that was ongoing or habitual ('Imperfect' here means 'unfinished');—cantábamos—we were singing—Cuando era niño, Juan cantaba - When he was a boy, John used to sing".

If during that presentation, the user actuates the INFO key 24 again, a more generic information screen will be provided which, for the example above, would state: "The screen you were just looking at was an information (INFO) screen. Information screens appear when you press the INFO key. The information screens help you to find out what options are available, as well as providing you with additional information about what you were looking at. For example, this INFO screen gives you information about INFO screens. INFO screens are available everywhere. To change the language of the INFO screens to Spanish, press SPN. To return to the INFO SCREEN you were looking at, press EXIT. To return to the 'Ready for a word . . .' screen, press CLEAR".

The user by selecting any combination of one of the two message language modes and one of the two input word language modes, selects one of four modes of operation. The four modes of operation are:

Mode 1. In this mode, the message language is Spanish and the input words are English. This mode is one that is normally selected by a Spanish speaker learning English. In this mode, the language of the various instructions and the information screens is in Spanish. In this first mode, the dictionary screen will show the English word that is entered and the translation into Spanish as well as certain English language variations on that input word and translations. The dictionary screen will provide Spanish language designation (e.g. "verbo transitivo") of the forms of the input word shown. In this mode, the various inflection screens will each show a separate tense of the input word with a Spanish language designation of what that tense is. For example, if the input word is "write", the second inflection screen will show "write: PRESENTE INDICATIVO - I write". The information screen about this tense will be in the Spanish language.

Mode 2. In this mode, the message language is Spanish and the input words are also Spanish. This is a mode that is normally used by a Spanish speaker learning English who seeks to input Spanish words and determine their English equivalence. In this mode, the language of the initial instructions and of the information screens are all in Spanish as they are in the first mode. However, in response to the entering of a Spanish language word, the dictionary screen will show the Spanish language word with Spanish language designation of grammatical structure together with the English language translations. The inflection screen will show the various inflections and grammatical modes in Spanish with the Spanish language word together with an English language designation of what that inflection state is.

Mode 3. In this mode, the message language is English and the input words are Spanish. This mode normally would be selected by someone whose native language is English who is learning Spanish. Accordingly, the language of the initial instructions and the information screens are all in English. In response to an input word in Spanish, a dictionary screen provides this Spanish word together with a translation into English and with various forms of the Spanish language input word and translations thereof. Each form is identified on the dictionary screen with an English language designation. For example, if the input word is "escribir" the dictionary screen will show the translation "to write" and will indicate that it is a "transitive or intransitive" verb. The initial inflection screen will show the main tenses of the verb and will show "yo escribo" to illustrate one of the present tenses and "yo escribiré" to show one of the future tenses. Additional inflection screens will show each tense specifically in the Spanish language designating the tense in the English language.

Mode 4. In this mode, the message language is English and the input words are also English. This is a mode that is normally used by an English speaker learning Spanish who seeks to input English words and determine their Spanish equivalence. In this fourth mode, the language of the initial instructions and of the information screens are in English as they are in the third mode. However, in response to the entering of an English language word, the dictionary screen will show the English language input word with English language designations of grammatical structure together with the Spanish language translations. The inflection screens will show the various inflections and grammatical modes in English with the English language word together with a Spanish language designation of what that inflection state is.

The set of screens displayed during the four modes of operation can be grouped into eight subsets of screens as follows:

Subsets A1 and A2: These are basically the message language information screens and in particular include the first instruction screen telling the user to enter a word, the information screens associated with that first instruction screen and the information screens associated with the dictionary screen. Subset A1 contains screens in Spanish and subset A2 contains screens in English. Thus the subset A1 screens are used in Modes 1 and 2 and the subset A2 screens are used in Modes 3 and 4.

Subsets B1, B2, B3 and B4 are the dictionary screens. Each of these subsets of screens are adapted to the mode with which the subset is used as follows:

Subset B1 contains the dictionary screens that display an input English word together with a Spanish translation and grammatical information set forth in the Spanish language. This subset of screens will be used in the Mode 1 operation.

Subset B2 contains the dictionary screens that display an input Spanish word together with English translation and grammatical information set forth in the Spanish language. This set of screens is used in Mode 2 operation.

Subset B3 contains the dictionary screens that display an input Spanish word with English translation and provide grammatical information in the English language. This subset of screens is used in Mode 3 operation.

Subset B4 contains the dictionary screens that display an input English word with Spanish translation and provide grammatical information in the English language. This subset of screens is used in Mode 4 operation.

Subsets C1 and C2 of the screens relate to the inflection screens and the information screens associated with those inflection screens. More particularly, these two subsets are as follows:

Subset C1 contains inflection screens which show an English input word and the English language tenses thereof together with the Spanish language designation of each tense and including the associated information screens which are in the Spanish language with English language examples. Since this set of screens tracks with the input word language, this set of screens is used in Modes 1 and 4.

Subset C2 contains inflection screens which show a Spanish language input word and Spanish language tenses thereof together with an English language designation of each tense and including the associated information screens which are in the English language with Spanish examples. Because the screens track with the Spanish input words, they are employed in Modes 2 and 3.

As shown on the following table, the four modes discussed herein each provide a set of screen presentations which are a combination of three of the above subsets.

| MODE | MESSAGE LANGUAGE | INPUT WORD LANGUAGE | SCREEN PRESENTATIONS (SUBSET OF SCREENS EMPLOYED) |
|---|---|---|---|
| 1 | SPN | ENG | A1 + B1 + C1 |
| 2 | SPN | SPN | A1 + B2 + C2 |
| 3 | ENG | SPN | A2 + B3 + C2 |
| 4 | ENG | ENG | A2 + B4 + C1 |

FIG. 2 is a logic diagram illustrating the manner in which one of the four modes can be selected. The first step, after turning the screen on is to select a message language as shown at step 30. In this embodiment either English or Spanish can be selected. Next is the "Select Input Word Language" step 32 to determine the language in which the input words are to be entered.

Once these two language mode choices are made, a word is input, the ENTER key 17 pressed and a translation/dictionary information state 34 is provided on the display screen. Various inflection states of the entered word can then be obtained by appropriate pressing of the INFL key. To simplify presentation, only the first inflection state 36 is illustrated in FIG. 2. Other inflection states are obtained by pressing respectively the NEXT and PREV keys to move forward and backward through the various inflection states. In one embodiment, the INFL key can be used as well as the NEXT key for advancing the inflection states.

At the inflection state 36, pressing the INFO key 24 will provide a display 38 that describes the inflection state 36. The description is in the message language selected.

Figure 3:
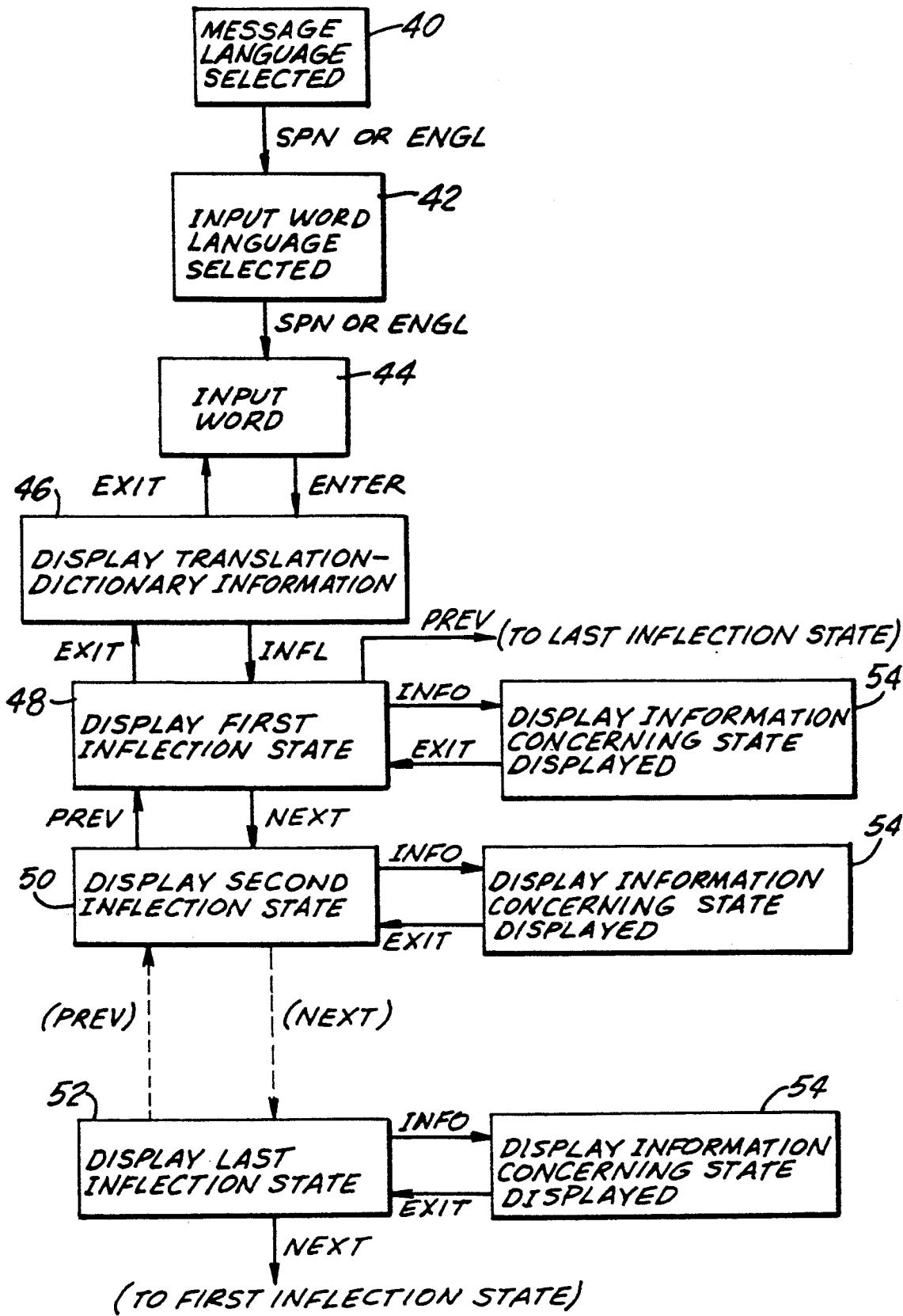
FIG. 3 is a logic diagram showing the sequence of screen displays following the selection of message and input word languages.

The sequence of states along any one of the four modes of the FIG. 2 arrangement is shown in FIG. 3.

FIG. 3 is a logic diagram showing the sequence of steps and subject matter displayed when a given message language or input word language has been selected. Thus, as shown in FIG. 3, the message language selection step 40 is undertaken to select either Spanish or English by appropriate actuation of the function key 18 and then selection with either the ENG key or SPN key. At that point, the input word language is selected at step 42, again by pressing either the SPN key or the ENG key. The operator then inputs a word at step 44 and enters that word by pressing the ENTER key 17. The screen will then display translation/dictionary information.

An example of translation/dictionary information that might be displayed where the message language is English and the input word language is Spanish is shown on the screen 11 in FIG. 1. Such a display is indicated at function box 46. By successively pressing the NEXT key, the user can access the inflection states provided which, in one embodiment, is thirteen inflection states. In that embodiment, the first inflection state, function box 48, provides a sampling of some of the forms of the input word. The complete conjugation is obtained by continuing to press the NEXT key (or INFL key) to obtain the individual inflection states, i.e. the second inflection state 50 through the last inflection state 52.

As indicated in FIG. 3, the user can move back and forth through the inflection states by pressing the PREV key to move back and the NEXT key to move forward. At the last inflection state 52, pressing the NEXT key will provide the first inflection state 46. At the first inflection state, pressing the PREV key will provide the last inflection state.

As also indicated, the EXIT key can be employed to move back through the various states in somewhat larger jumps than the NEXT and PREV key. That is, during the display of any of the inflection states, pressing the EXIT key will bring the user back to the translation/dictionary information and pressing the EXIT key from that point will bring the user back to the point where a new input word can be entered.

As shown in FIG. 3, at any point where there is a display, pressing the INFO key will provide a information display 54 about the state involved and in particular will give specific information about any inflection state involved. To return to the main screen display from an information screen display, the EXIT key is pressed.

The translation/dictionary information 46 is presented in response to the user controlled ENTER key. Inflection information is presented in response to the user controlled INFL key and is parceled out one inflection state at a time by the user controlled NEXT and PREV keys. A third level of information is controlled by the INFO key which provides information about the inflection state currently presented on the screen.

The significance of this multi-layer access arrangement is that it provides information to the user in a fashion that the user controls. It avoids burying the user in too much data. Yet it provides extensive information at the appropriate point in the user's processing of the information.

APPENDIX A

Attached as Appendix A (pages 1-88) is a listing of the embodiment of this invention which is described herein. The listing is in C programming language. The listing is divided into five files.

File No. 1 entitled: Main Keystroke Functions starts on page 2. It is the most important file. It controls the main functions and in particular the functions that occur in response to each key stroke from the keyboard. The code starting at page 5 is the primary code for the device and by itself should provide all that a programmer would need. The first three and a half pages on this file controls the situation where a particular word has two sets of definitions and meanings such as a word which is both a noun and a verb. The code covering the dual meaning for a given input word feature is on the first four pages of File No. 1.

File No. 2, Definition List starts at page 16 and provide code definitions.

File No. 3, Text Listing With Look Up Table starts at page 25 and runs through page 81. The Look Up Table on the last few pages provides an appropriate linkup to the definition listing of File 2.

File No. 4, State Relation Table starts at page 82. It is a file of the relationship between the various inflection states.

File No. 5 at page 88 is a one-page definition file of certain significant definitions that are used in multiple items of code.

What is claimed is:

1. A dual language dictionary machine having a keyboard for inputting an operator selected word and a display screen for displaying input words, inflections of input words and information messages about the input word and its inflections comprising;

a first language database and a second language database, an operator actuated input language selection means to select either of said first or second languages as an input word language, said input word language being the primary language selected and the other of said first and second languages being the translation language, first processing means responsive to an input word in said primary language to provide a set of inflection words for said input word in said primary language, operator actuated sequencing means to sequence through said inflection words, second processing means responsive to said input word in said primary language to provide a translation of said input word and of its inflections into said translation language, and operator actuated message language selection means to select either of said first or second languages as a message language, and third processing means to provide information concerning said input word and said inflection in said message language.

2. The dual language dictionary machine of claim 1 wherein:

said message language is said primary language.

3. The dual language dictionary machine of claim 1 wherein:

said message language is said translation language.

4. The dual language dictionary machine of claim 1 wherein:

said information provided in said message language includes instruction messages and grammar information concerning said input word and its inflections.

5. The dual language dictionary machine of claim 4 wherein:

said message language is said primary language.

6. The dual language dictionary machine of claim 4 wherein:

said message language is said translation language.

7. The dual language dictionary machine of claim 1 further comprising:

an operator actuated first sequencing key and, an operator actuated second sequencing key, means responsive to actuation of said first sequencing key to sequence the screen display in a forward direction through the said inflection words, and means responsive to actuation of said second sequencing key to sequence the screen display in a reverse direction through said inflection words, sequencing forward from the last one of a plurality of inflection words accessing the first one of said plurality of inflection words.

8. The dual language dictionary machine of claim 1 further comprising:

an operator actuated back-up key, and processing means responsive to actuation of said back-up key to access a previously displayed screen in the series of screens providing information concerning an input word.

9. The dual language dictionary machine of claim 7 further comprising:

an operator actuated back-up key, and processing means responsive to actuation of said back-up key to access a previously displayed screen in the series of screens providing information concerning an input word.

10. The dual language dictionary machine of claim 7 wherein:

said message language is said primary language.

11. The dual language dictionary machine of claim 7 wherein:

said message language is said translation language.

12. The dual language dictionary machine of claim 7 wherein:

said information provided in said message language includes instruction messages and grammer information concerning said input word and its inflection.

13. The dual language dictionary machine of claim 9 wherein:

said message language is said primary language.

14. The dual language dictionary machine of claim 9 wherein:

said message language is said translation language.

15. The dual language dictionary machine of claim 9 wherein:

said information provided in said message language includes instruction messages and grammar information concerning said input word and its inflections.

16. The dual language dictionary machine of claim 10 wherein:

said information provided in said message language includes instruction messages and grammer information concerning said input word and its inflections.

17. The dual language dictionary machine of claim 11 wherein:

said information provided in said message language includes instruction messages and grammar information concerning said input word and its inflections.

18. The dual language dictionary machine of claim 13 wherein:

said information provided in said message language includes instruction messages and grammar information concerning said input word and its inflections.

19. The dual language dictionary machine of claim 14 wherein:

said information provided in said message language includes instruction messages and grammar information concerning said input word and its inflections.

* * * * *